(12) United States Patent
Van Den Bossche et al.

(10) Patent No.: US 8,878,415 B2
(45) Date of Patent: Nov. 4, 2014

(54) METHOD FOR FABRICATING A STATOR FOR A PERMANENT MAGNET MACHINE AND STATOR THEREOF

(75) Inventors: Alex Van Den Bossche, Herzele (BE); Peter Sergeant, Lovendegem (BE)

(73) Assignee: Universiteit Gent, Zwijnaarde (BE)

( * ) Notice: Subject to any disclaimer, the term of this patent is extended or adjusted under 35 U.S.C. 154(b) by 317 days.

(21) Appl. No.: 13/379,136

(22) PCT Filed: Jun. 18, 2010

(86) PCT No.: PCT/EP2010/058671
§ 371 (c)(1),
(2), (4) Date: Dec. 19, 2011

(87) PCT Pub. No.: WO2010/146175
PCT Pub. Date: Dec. 23, 2010

(65) Prior Publication Data
US 2012/0104894 A1    May 3, 2012

(30) Foreign Application Priority Data

Jun. 20, 2009  (GB) .................................. 0910637.8

(51) Int. Cl.
*H02K 1/06*       (2006.01)
*H02K 15/02*      (2006.01)
*H02K 1/14*       (2006.01)
*H02K 21/24*      (2006.01)
(52) U.S. Cl.
CPC ................. *H02K 1/14* (2013.01); *Y02E 10/725* (2013.01); *H02K 21/24* (2013.01); *Y02B 10/30* (2013.01); *H02K 15/022* (2013.01)
USPC ...... 310/216.057; 310/216.015; 310/216.016; 310/216.059; 29/609

(58) Field of Classification Search
CPC .................................. H02K 1/06; H02K 1/14
USPC .................. 310/216.011, 216.016, 216.057, 310/216.059, 216.061, 216.062, 216.096, 310/216.015; 29/609
See application file for complete search history.

(56) References Cited

U.S. PATENT DOCUMENTS 4,387,508 A * 6/1983 Wyatt .............................. 29/738
4,891,538 A * 1/1990 Oudet ........................... 310/162

(Continued)

FOREIGN PATENT DOCUMENTS

CN    2822007    9/2006
CN    2859918    1/2007

(Continued)

OTHER PUBLICATIONS

Machine Translation JP2004173475 (2004).*

(Continued)

*Primary Examiner* — Tran Nguyen
*Assistant Examiner* — Jose Gonzalez Quinones
(74) *Attorney, Agent, or Firm* — Bacon & Thomas, PLLC

(57) ABSTRACT

Permanent magnet synchronous machines (100) are described having good efficiency, as well as corresponding methods for making a stator (110) or stator teeth (114) for such machines. A method for fabricating a stator (110) for an axial flux permanent magnet synchronous machine is for example described comprising obtaining several sets of substantially identical laminates (302), and stacking the sets of substantially identical laminates (302) so that a subsequent laminate has a part overlapping (304) the previous laminate and a part not overlapping (306) the previous laminate. Alternatively, a method of manufacturing a stator (110) is described wherein the method comprises obtaining a set of laminates (302) connected to each other with a thin strip (402) of material and creating a stack by folding the laminates (302) along the thin strip (402) of material. The stator teeth (114) can furthermore be fabricated such that the air gap (602) that is formed between the stator tooth and the permanent magnets changes along the radial direction.

11 Claims, 12 Drawing Sheets

(56) References Cited

U.S. PATENT DOCUMENTS

| | | |
|---|---|---|
| 2003/0111926 A1* | 6/2003 | Decristofaro et al. ........ 310/216 |
| 2005/0017596 A1 | 1/2005 | Naito et al. |
| 2006/0028093 A1 | 2/2006 | Minagawa et al. |
| 2007/0145848 A1 | 6/2007 | Nakahara et al. |

FOREIGN PATENT DOCUMENTS

| | | |
|---|---|---|
| DE | 1613289 | 1/1971 |
| DE | 3146703 | 7/1983 |
| DE | 10359577 | 9/2005 |
| EP | 1450464 | 8/2004 |
| EP | 1450464 A1 * | 8/2004 |
| EP | 1624555 | 2/2006 |
| EP | 1801952 | 6/2007 |
| FR | 2531820 | 2/1984 |
| GB | 330790 | 6/1929 |
| GB | 754361 | 8/1956 |
| GB | 1571876 | 7/1980 |
| GB | 2194104 | 2/1988 |
| GB | 2315607 | 2/1998 |
| GB | 2338117 | 12/1999 |
| JP | 51133713 | 11/1976 |
| JP | 55150742 | 11/1980 |
| JP | 57180339 | 11/1982 |
| JP | 57193955 | 11/1982 |
| JP | 378447 | 4/1991 |
| JP | 03078447 A * | 4/1991 |
| JP | 2004173475 A * | 6/2004 |
| JP | 2005348552 | 12/2005 |
| JP | 20095543 | 1/2009 |
| WO | 0057538 | 9/2000 |
| WO | 0129955 | 4/2001 |
| WO | 0245242 | 3/2002 |
| WO | 2009057674 | 5/2009 |

OTHER PUBLICATIONS

International Search Report in PCT/EP2010/058671, Jul. 22, 2011.

* cited by examiner

METHOD FOR FABRICATING A STATOR FOR A PERMANENT MAGNET MACHINE AND STATOR THEREOF

FIELD OF THE INVENTION

The invention relates to the field of electrical machines. More particularly, the present invention relates to axial flux permanent-magnet synchronous machines and methods for producing these.

BACKGROUND OF THE INVENTION

Axial flux permanent-magnet synchronous machines (AF-PMSM) have become popular in the last few decades because they may have a higher torque at low speed in comparison with radial flux machines with inner rotor. In very special designs, outer rotor designs may also compete in torque/weight or in efficiency. AFPMSM can for example be attractive when the axial length is small and the pole number is high. AFPMSMs make it possible to implement a high number of poles. Even at low rotation speed, the voltage per turn can be high enough to obtain a given power with a rather low stator current, and a low number of turns.

The property of high torque at low speed is interesting for several applications, such as traction and energy generation. The AFPMSM is investigated as a high efficiency generator for e.g. wind energy systems, in particular "direct-drive" generators with direct coupling to the shaft, causing the nominal speed of the machine to be very low. For example, a single rotor single stator as well as a single rotor dual stator AFPMSM have previously been designed for direct-drive wind applications. In literature, during the last years, many aspects have been investigated.

Cogging torque reduction and optimisation of the flux generated per winding are two examples of aspects which have been studied intensively in literature. In JP2005-348552 a number of sets of identical laminates are stacked to form a tooth of a stator having a T-shape. Within each set, the laminates are stacked in such a way that they completely overlap. The remaining holes between the different teeth still results in a cogging torque which is substantially high. In order to further reduce the cogging torque, the remaining holes may be filled with a magnetic powder. However, powder particles are likely to come loose during use because of interaction with the magnets of the rotor, resulting in damage or destruction of the electrical machine. Moreover, such particles typically show a lower permeability and higher losses compared to the solid materials. Hence, magnetic powder is only a partial solution.

A number of manufacturing techniques for stator teeth are known. Some are based on the use of laminates and stacking of such laminates in order to form appropriately shaped stator teeth. Stacking of such laminates nevertheless often is tedious and time consuming and there is room for improvement.

Although a number of approaches have already been described, there still is room for further optimisation of the axial flux synchronous machine.

SUMMARY OF THE INVENTION

It is an object of the present invention to provide efficient axial flux permanent-magnet synchronous machines, methods of manufacturing such machines or components thereof and methods of using such machines or components thereof.

It is an advantage of embodiments according to the present invention that methods and systems are provided for providing a stator section having a good or optimal filling with magnetic material saturating substantially simultaneously.

It is an advantage of embodiments according to the present invention that efficient methods are provided for manufacturing stator teeth or stator sections.

It is an advantage of embodiments according to the present invention that an increase of efficiency or the total torque per weight can be obtained. In view of the large volume of installed power of electrical machines, each increase in energy efficiency results in a significant reduction of power consumption in the world.

It is an advantage of embodiments according to the present invention that it can be applied in or for general drive application in industry, household or consumer goods. It is an advantage that such embodiments can e.g. be used in motors for electrical vehicles, generators for combined heat and power, generators for wind turbines, etc.

It is an advantage of embodiments according to the present invention that good and/or efficient methods are provided for manufacturing the stator of an axial flux permanent magnet synchronous machine.

The above objective and/or one or more of the advantages is accomplished by a method and device according to the present invention.

According to one first aspect, the present invention relates to a method for fabricating a stator for an axial flux synchronous machine, the method comprising obtaining a set of substantially identical laminates, and stacking the set of substantially identical laminates so that the substantially identical laminates are shifted in such a way that a subsequent laminate has a part overlapping the previous laminate and a part not overlapping the previous laminate, the part overlapping being different in size for at least two positions in the stacked set of substantially identical laminates. Stacking the set of substantially identical laminates may comprise stacking the laminates such that the part overlapping changes throughout the stacked set of substantially identical laminates. Stacking the set of substantially identical laminates may comprise stacking the laminates such that the part overlapping changes monotonously throughout the stacked set of substantially identical laminates. It is an advantage of embodiments of the present invention that manufacturing of stator teeth can be obtained having an appropriate and accurate teeth shape. Stacking the set of substantially identical laminates may comprise stacking the laminates such that the part overlapping increases throughout the stacked set of substantially identical laminates.

Stacking may comprise providing laminates of the set of substantially identical laminates in a holder and positioning the laminates by attracting them to a side of the holder. It is an advantage of embodiments of the present invention that manufacturing of the stator can be made efficient because of ease of positioning of the laminates. Attracting may be performed by providing magnets near the edges of the holder, provided in a U-shape or V-shape or cradle shape. The holder may be U-shaped or V-shaped or cradle shaped and attracting may be performed by providing magnets near the edges of the U-shaped or V-shaped holder. It is an advantage of embodiments of the present invention that manufacturing of the stator teeth is made more efficient.

Manufacturing the stator teeth may comprise performing the steps of providing and stacking for two or three different sets of substantially identical laminates. It is an advantage of embodiments according to the present invention that methods for manufacturing can be obtained whereby the production can be made relatively cheap. The manufacturing may be based on two or more different sets, e.g. between 1 and 10 sets, e.g. between 1 and 5 sets, e.g. between 1 and 3 sets.

The present invention also relates to a stator comprising at least one stator tooth, the stator tooth comprising a stacked set of substantially identical laminates so that the substantially identical laminates are shifted in such a way that a subsequent laminate has a part overlapping the previous laminate and a part not overlapping the previous laminate, the part overlapping being different in size for at least two positions in the stacked set of substantially identical laminates. The part overlapping may change throughout the stacked set of substantially identical laminates. The part overlapping may change monotonously throughout the stacked set of substantially identical laminates. Monotonously changing may be increasing. The stator as described above may be for use in an axial flux machine. The stator as described above may be for use in an axial flux permanent magnet synchronous machine.

The stator tooth may comprise grain oriented material having its rolling direction in the direction of the stator tooth. The direction of the stator tooth may be the dominant direction of the magnetic field from the magnets and the field from the winding around the stator tooth. The rolling direction may be the direction in which the magnetic properties of the grain oriented material are optimum. The present invention also relates to an axial flux machine, the axial flux machine comprising a stator as described above. The axial flux machine may be an axial flux permanent magnet synchronous machine.

It is an advantage of embodiments according to embodiments of the above aspect of the present invention that manufacturing of the 3 dimensional shape of the stator can efficiently be performed.

It is an advantage of embodiments of the present invention that an electrical machine having stator teeth manufactured according to the present invention exhibits a low or decreased cogging torque compared to known systems that are using all identical laminates and/or fully overlapping laminates.

The present invention relates to a method for fabricating a stator for an axial flux machine, the method comprising obtaining a set of laminates, wherein each of the laminates is connected to a neighbouring laminate through a thin strip of material, and folding the set of laminates such that a stack of laminates is formed as part of the stator tooth and removing the connection by removing the thin strip of material. It is an advantage according to embodiments of the present invention that an efficient and/or easy method for manufacturing a stator or more particularly a stator tooth is obtained. It is an advantage of embodiments according to the present invention that assembly of the complete geometry of the tooth is relatively easy. The method may be especially suitable for fabricating a stator for an axial flux permanent magnet synchronous machine. Obtaining a set of laminates may comprise cutting a set of laminates from sheet material, wherein a plurality of laminates have a different width. Cutting a set of laminates may comprise laser cutting the laminates. It is an advantage of embodiments according to the present invention that an accurate stator tooth can be made. In one alternative to laser cutting, the laminates may for example be made by spark erosion or water jetting or even punching. Obtaining a set of laminates may comprise obtaining a set of laminates connected to neighbouring laminates through a thin strip of material whereby the thin strip has a width being only a limited fraction of the length of the laminates. The width may be less than 10%, advantageously less than 5% of the length of the laminate. Obtaining a set of laminates may comprise obtaining a set of laminates connected to neighbouring laminates through a thin strip of material whereby the thin strip of material is only present at a broadened portion along the length of the laminates.

The present invention also relates to a stator comprising at least one stator tooth, the stator tooth comprising a stacked set of laminates, wherein the laminates were connected during assembly, stacked by folding and wherein connections between the laminates were removed after folding. The thin strip may have a width being only a limited fraction of the length of the laminates. For at least part of the stacked set of laminates, the size of the laminates may change monotonously throughout that part. The stator as described above may be for use in an axial flux machine. The stator as described above may be for use in an axial flux permanent magnet synchronous machine. The stator tooth may comprise grain oriented material having its rolling direction in the dominant direction of the stator tooth. The direction of the stator tooth may be the dominant direction of the magnetic field from the magnets and the field from the winding around the stator tooth. The rolling direction may be the direction in which the magnetic properties of the grain oriented material is optimum. The present invention also relates to an axial flux machine, the axial flux machine comprising a stator as described above. The axial flux machine may be an axial flux permanent magnet synchronous machine.

It is a further advantage of embodiments of the present invention that an electrical machine having stator teeth manufactured according to the present invention exhibits a low or reduced cogging torque.

It is an advantage of embodiments according to the present invention that making stator teeth using a foldable strip of interconnected laminates may allow, also in radial flux machines that automated handling can be performed.

It is an advantage of embodiments according to embodiments of the above aspect of the present invention that manufacturing of the 3 dimensional shape of the stator can efficiently be performed.

The present invention furthermore relates to a slotted axial flux machine, the machine comprising a stator and a permanent magnet, wherein an air gap between the stator and the permanent magnet is changing along the radial direction, the variation being static in time and during operation. It is an advantage of embodiments of the present invention that the change of the air gap can be optimized as to result in a more homogenous induction distribution across the cross-section of the stator teeth, taking into account a certain level of current e.g. the nominal current level. It is an advantage of embodiments according to the present invention that a substantially homogeneous induction level can be provided in the whole stator tooth, resulting in more optimal use of the stator tooth. An air gap changing along the radial direction may mean the air gap between the stator and the permanent magnet may have a non-constant distance profile between the stator and the permanent magnet along the radial direction. The axial flux machine may be an axial flux permanent magnet synchronous machine.

The stator may comprise at least one stator tooth adapted in shape so as to induce an air gap that is changing along the radial direction between the at least one stator tooth and the permanent magnet. The stator may be a stator as described in one of the above aspects.

The axial flux machine may comprise a rotor comprising at least one permanent magnet, wherein the rotor may be adapted in shape so as to induce an air gap that is changing along the radial direction.

The present invention also relates to a stator for use in an axial flux machine, the stator comprising at least one stator tooth being adapted in shape so as to induce an air gap changing along the radial direction between the at least one stator tooth and a permanent magnet of the axial flux machine, the air gap being static in time, i.e. also during operation.

The present invention furthermore relates to a method for manufacturing such a stator, using any of the methods for manufacturing as described above. It is an advantage of embodiments according to the present invention that the system with air gap having a non-constant thickness along a radial direction can easily be made using a manufacturing technique applying laser cutting or spark erosion.

It is an advantage of embodiments according to the present invention that good and/or efficient in synchronous machines are provided by providing geometrical optimisation of the stator in order to obtain more homogeneous flux distribution and saturation. Such optimisation may be using a variable air gap along a radial direction, but e.g. also folding of tooth tips of the outer laminations in radial direction, etc.

Particular and preferred aspects of the invention are set out in the accompanying independent and dependent claims. Features from the dependent claims may be combined with features of the independent claims and with features of other dependent claims as appropriate and not merely as explicitly set out in the claims. Embodiments of the invention will now further be discussed in the detailed description in conjunction with the drawings. The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

In the following detailed description, numerous specific details are set forth in order to provide a thorough understanding of the invention and how it may be practiced in particular embodiments. However it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Figure 1:
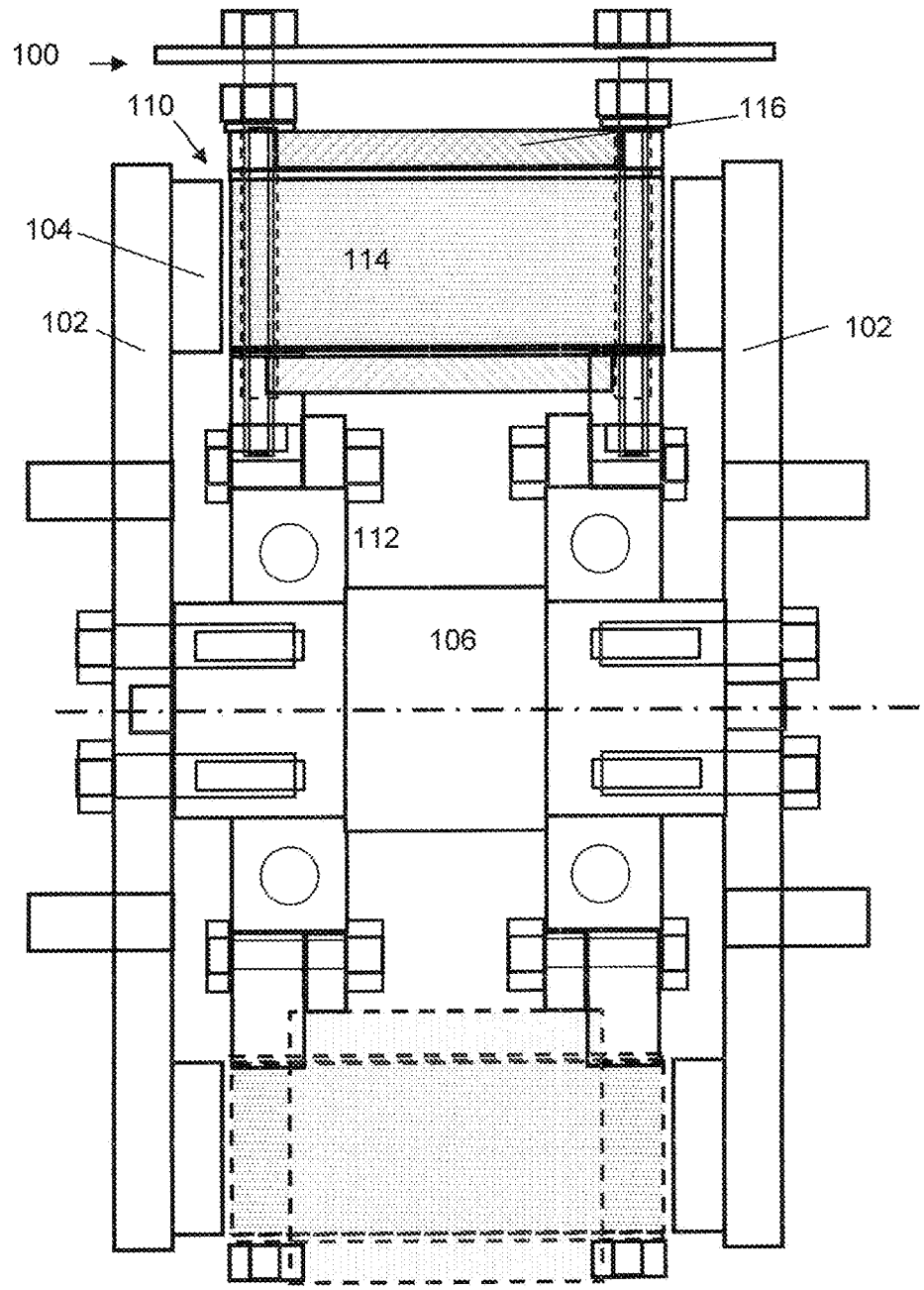
FIG. 1 illustrates an example of part of an axial flux permanent magnet synchronous machine, a number of embodiments of the present invention relating to or being implementable in such machines.
Figure 2:
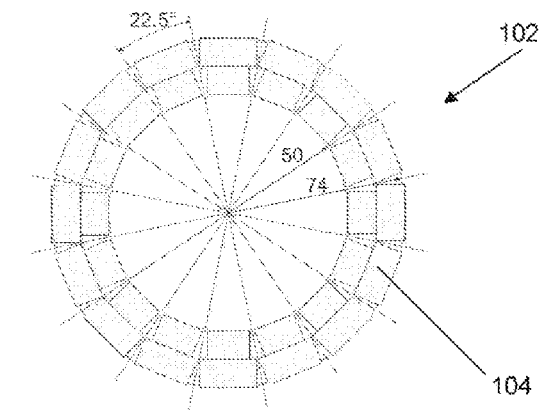
FIG. 2 illustrates an example of a rotor geometry for an AFPMSM as can be used in embodiments according to the present invention.

It is to be noticed that the term "comprising", used in the claims, should not be interpreted as being restricted to the steps or elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. Where reference is made to the term consists of, the latter implies that no other elements are present.

Where in the present invention reference is made to axial flux machine, reference also may be made to a brushless DC machine. The embodiments according to the present invention relate to an axial flux permanent magnet synchronous machine. By way of illustration, an example of an axial flux permanent magnet synchronous machine as can be used in embodiments according to the present invention is shown in FIG. 1. The example shown—the present invention not being limited thereto—illustrates a housing 100 of the machine and a set of rotors 102 with permanent magnets 104 mounted thereto. The rotors 102 are connected to the rotor shaft 106. The stator 110, positioned with respect to the rotors 102 by positioning the stator 110 via bearings 112 with respect to the rotor shaft 106, comprises a plurality of stator teeth 114. Each stator tooth 114 has a winding 116, e.g. copper winding, in which current and thus voltage will be induced. Other components may also be present. A possible setup for the rotor 102 with permanent magnets 104 is shown in FIG. 2.

According to a first aspect, the present invention relates to a method for producing a stator of such an axial flux machine, e.g. an axial flux permanent magnet synchronous machine, a method for producing an axial flux machine, e.g. an axial flux permanent magnet synchronous machine, comprising such a stator, and a stator and/or axial flux machine, e.g. an axial flux permanent magnet synchronous machine, thus obtained. The axial flux machine typically may have a stator 110 consisting of I-shaped teeth 114 with concentrated pole copper windings 116, and optionally two rotors 102 with permanent magnets 104, as e.g. shown in FIG. 1. One of the advantages of the I-shapes in the axial flux is that they can be insulated to ground. This means that a very low capacitance to the frame can be obtained, this is a significant advantage in EMC electromagnetic compatibility while feeding with pulse width modulation. The manufacturing method for fabricating a stator 114 comprises obtaining a set of substantially identical laminates 302, also referred to as laminations, and stacking the set of substantially identical laminates 302 the substantially identical laminates are shifted in such a way that a subsequent laminate has a part overlapping 304 the previous laminate and a part not overlapping 306 the previous laminate, the part overlapping 304 being different in size for at least two positions in the stacked set of substantially identical laminates. Where in embodiments of the present invention reference is made to laminates being shifted, this encloses laminates being translated with respect to each other. Where in embodiments of the present invention reference is made to two positions in the stacked set of laminates, reference may be made to two different heights in the stack. Obtaining a set of substantially identical laminates may be performed by punching, laser cutting or spark erosion of such laminates out of a sheet. The laminate may have a sheet thickness in the range 0.2-0.5 mm, a length between a few centimeters and a few tens of centimeters, and a width that is determined by the number of teeth and the circumference. As the laminates may be uniform, manufacturing and subsequent assembly can be less complex. The laminates may be made of any suitable material, such as for example non-oriented material, like non-oriented steel, or for example grain-oriented material.

The method for manufacturing may comprise stacking the laminates such that the part overlapping varies throughout the stack. In some embodiments such varying may be monotonously increasing or decreasing. Such a stacking advantageously can result in a higher filling factor between the teeth as compared to the prior art, resulting in a substantial reduction of the cogging torque compared to known systems. In some embodiments, two or more sets of identical laminates are used, the laminates being identical within each set, but differing between the different sets. The number of sets used may e.g. be between 1 and 10, between 1 and 5 or between 1 and 3. A larger number of sets would allow a larger filling factor for the teeth, resulting in a higher reduction of the cogging torque, whereas a smaller number of sets eases the manufacturing. By increasing the number of sets of identical laminates, the shape of the stator teeth can be more easily adapted to the desired shape, making it easier to wind the windings onto the teeth.

Figure 3A:
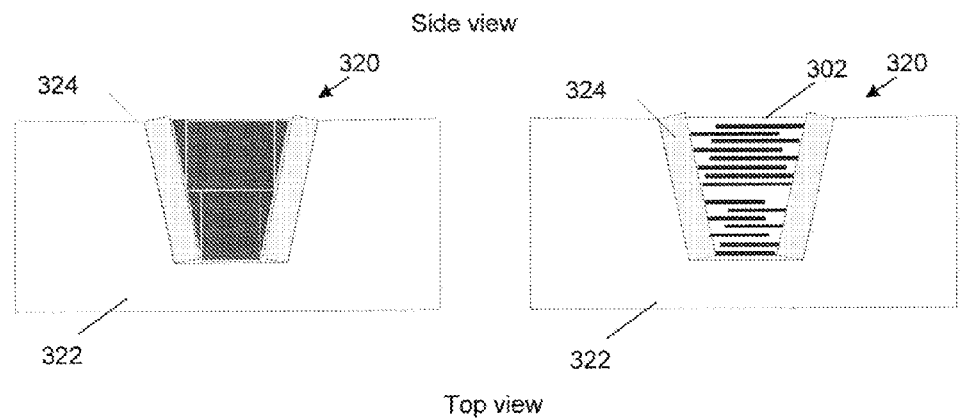
FIG. 3A, FIG. 3B and FIG. 3C illustrate an example of a U-shaped stacking means for stacking laminations (FIG. 3A), laminations that can be used for manufacturing stator teeth (FIG. 3B) and a cross-section of stacked laminations in a stator tooth (FIG. 3C) respectively, according to embodiments of the present invention.
Figure 3A:
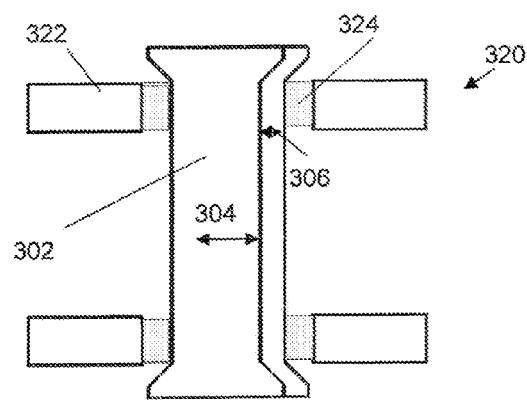
Figure 3B:
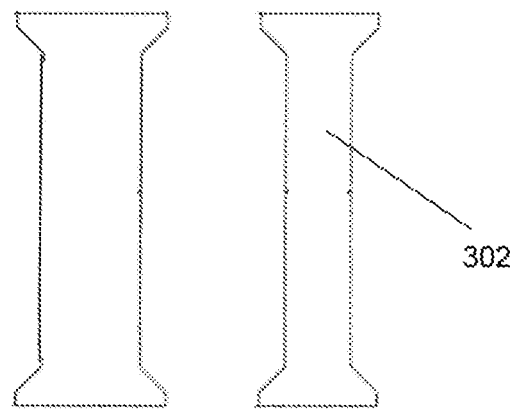
Figure 3C:
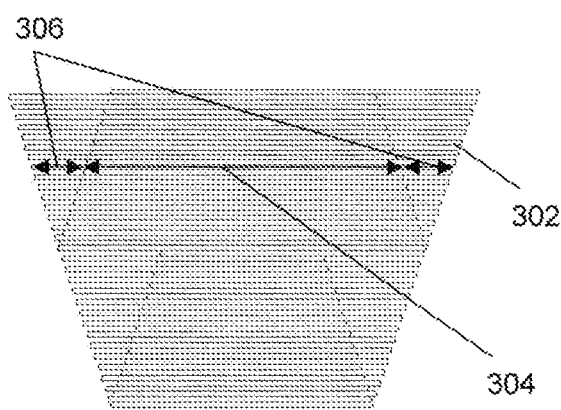

In an advantageous embodiment, the stacking with overlap can be done by using a holder 320, e.g. one part 322 being made of pvc or wood, another part 324 being a magnet, and positioning the laminates by attracting the laminates 302 to the edges of the holder 320 using the magnetic part 324. For example, a U-shaped or V-shaped or cradle shaped tooth holder may be used with magnets behind the vertical edges of the U-shape or V-shape and the laminates can be positioned quickly and accurately because they are attracted to the vertical edges of the U-shape or V-shape. The U-shaped or V-shaped holder is shown in FIG. 3A in side view and top view, whereby also the magnets 324 can be seen. The one portion 322 of the housing 320 may be made of any suitable material, such as for example PVC or wood also iron and aluminium are possible. By way of illustration FIG. 3B illustrates laminate shapes for the two sets of laminates used for constructing a stator tooth 114 as for a stator 100 as can be used with a rotor as shown in FIG. 2. FIG. 3C illustrates the stacked sets of laminates forming a part of the stator tooth. After the stacking of the laminates in the U-shaped or V-shaped gutter, the laminates may be clamped together in the centre (between the two pairs of magnets) temporarily to avoid that the positions of the laminations change during the following step. The following step is to put the tips of the laminated stack, which are "outside" the magnets into an epoxy glue. The latter is illustrated in FIG. 3A in the top view drawing. After drying of the epoxy, the clamp is removed and the laminated stack can be taken out of the U-shaped or V-shaped gutter. The next step is to remove sharp edges from the laminated stack, and add insulating tape around the lamination. Then, the copper windings 116 can be wound on the stator tooth.

Although the embodiments of the above aspect have been discussed with reference to a manufacturing method for a stator, embodiments of 114 the present aspect also relate to a stator tooth comprising a stacked set of substantially identical laminates so that a subsequent laminate has a part overlapping the previous laminate and a part not overlapping the previous laminate, a stator comprising such stator teeth and copper windings around the stator teeth, or a machine comprising such a stator.

According to a second aspect, the present invention relates to a method for producing a stator of such an axial flux machine, e.g. an axial flux permanent magnet synchronous machine, a method for producing an axial flux machine, e.g. an axial flux permanent magnet synchronous machine, comprising such a stator, and a stator and/or axial flux machine, e.g. an axial flux permanent magnet synchronous machine, thus obtained. The axial flux machine 100 typically may have a stator 110 consisting of I-shaped teeth 114 with concentrated pole copper windings 116, and optionally two rotors 102 with permanent magnets 104, as e.g. shown in FIG. 1. The manufacturing method for fabricating a stator 110 comprises obtaining a set of laminates 302, wherein each of the laminates 302 is connected to a neighbouring laminate through a thin strip 402 of material and folding the set of laminates such that a stack of laminates is formed as part of the stator tooth. The laminates may have a thickness in the range of 0.2-0.5 mm. The size of the different laminates may vary, such that, when stacked, the preferred three dimensional shape is obtained for the tooth. The size of the laminates may e.g. be such that a monotonously change in size is present throughout the stack. The width of the thin strip corresponds with the dimension of the thin strip 402 extending in the y direction in FIG. 4. The width of the thin strip 402 may be only a limited fraction of the length of the laminates, e.g. less than 10%, advantageously less than 5% of the length of the laminates. The set may, prior to removing of the thin strips 402, connect neighbouring laminates via thin strips of material only being present at a broadened portion along the length of the laminates.

The interconnected laminates 302 may for example be formed by laser cutting or spark erosion, although the invention is not limited thereto. In one embodiment, the laminations 302 thus may be made as a "serpentine", like a paper garland. This means that the different I-shape laminations for a tooth 114 are cut from the material, e.g. steel plate in such a way that they remain connected by a thin strip of material. All I-shapes can have different geometries. After cutting, the serpentine is folded like an accordion, resulting in the complete geometry of the tooth without a difficult assembly.

Figure 4:
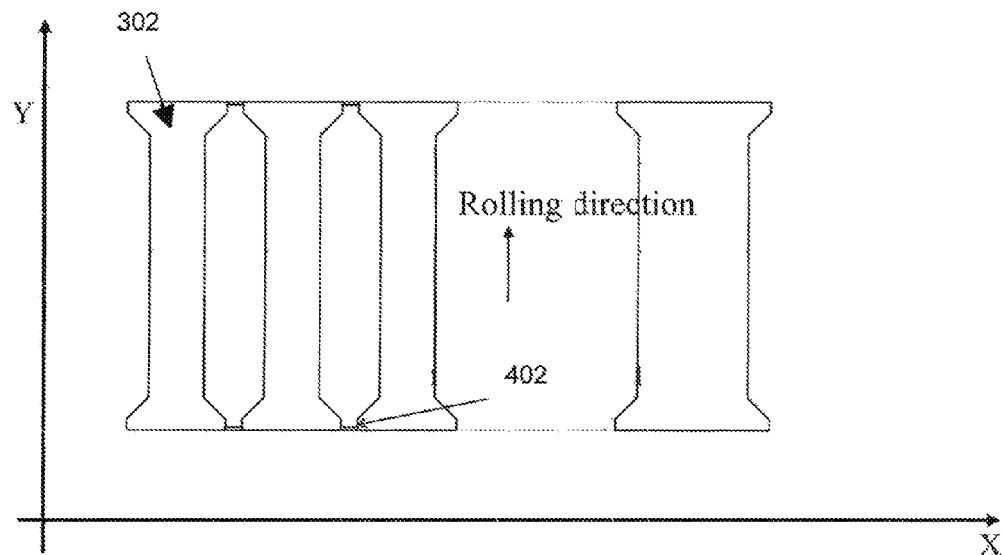
FIG. 4 illustrates an example of laminations produced in serpentine shape, as can be used for manufacturing stator teeth, according to embodiments of the present invention.

To allow easy folding, the width of the thin strip 402, being defined as the size of the strip along the Y-axis as indicated in FIG. 4, can for example be chosen to be smaller than 10% than the length of the laminate 302, e.g. smaller than 5% than the length of the laminate. The width of the strip 402 may be chosen small enough in order to reduce the risk of negatively impacting the magnetic characteristics of the surrounding material upon folding of the strip 402. The width of the strip 402 may be chosen smaller or substantially smaller than the width of the tooth 114 in order to reduce the risk of creating an unwanted air gap between the laminates 302, i.e. an air gap perpendicular to the laminate plane, upon folding. Reducing the air gap increases the filling factor, resulting in a reduction of the cogging torque. The width of the strip 402 can be chosen to reduce the risk of breaking during cutting. One example may be a thickness of 0.5 mm, although the invention is not limited thereto.

Figure 5:
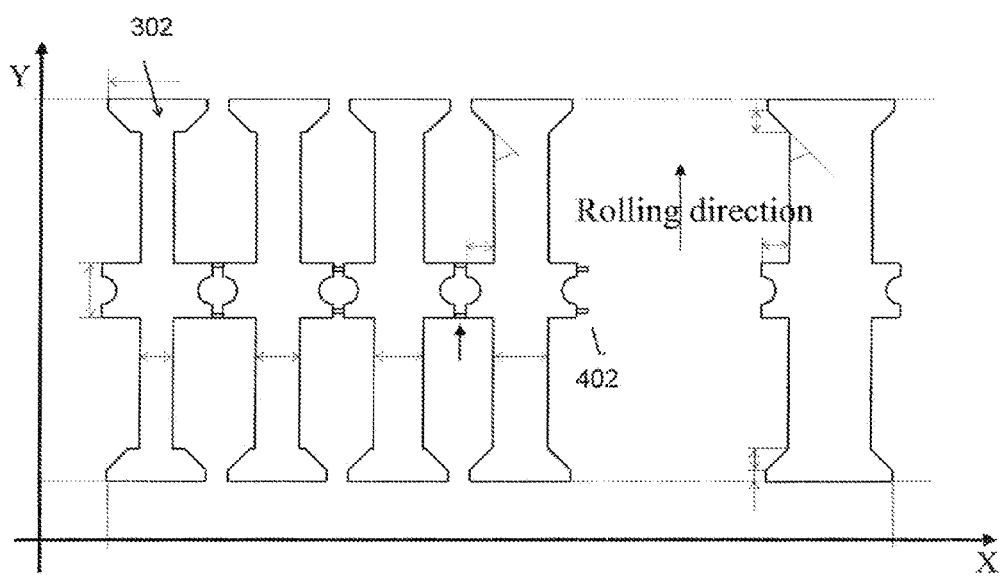
FIG. 5 illustrates an alternative example of laminations produced in serpentine shape, as can be used for manufacturing stator teeth, according to embodiments of the present invention.

With respect to the length of the thin strip 402, indicated by the size of strip along the X-direction shown in FIG. 4, the length of the thin strip 402 is preferably larger than the thickness of the laminates 302 such that folding is not prevented by the thin strip 402 as the curvature cannot be infinite. On the other hand the thin strip 402 should not be longer than necessary as this might avoid the strips to be nicely folded on top of each other. One example may be a length of 0.5 mm for laminates of 0.2 mm thickness, although the invention is not limited thereto. According to an embodiment of the invention, the position of the thin strip 402 is located at places which are not part or little part of the magnetic flux path such that any negative impact on the magnetic characteristics of the material (mainly a decrease of the magnetic permeability) occurs in an area of the laminates 302 which is magnetically not or far less important. As an example, the thin strip 402 can be located at the edges of the tooth and/or in the middle of the tooth as indicated on FIG. 5. It is clear that in normal operation in the middle of the tooth there is a limited magnetic flux as this part of the tooth is used for reasons of ease of mechanical construction. In one embodiment, the thin strip 402 is positioned at a broadened portion along the length of the laminates 302, e.g. near the edges of the tooth 114 or in the middle of the laminate 302. The broadened portion of the latter can also ease the assembly of the stator tooth into the electrical machine.

After the folding like a paper garland, the interconnections between the laminates in the folded thin strip are removed. Removing of the interconnections allows the laminates 302 being stacked without any parasitic air gap between them. This results in a higher density of magnetic material, a higher filling factor and a reduction of the cogging torque. Removing these interconnections further reduces the risk of circulating currents. Indeed, in case the interconnection between two consecutive laminates is not removed any accidental connection (e.g. bad coating or insufficient coating) at the any other place of the laminates will create a closed loop into which circulating currents can flow freely causing additional losses, hot spots or in the end destruction of the machine. Removing can be performed mechanically, physically or electronically.

Afterwards, after removing the thin strip 402, optionally the laminations 302 may be etched or mechanically removed by an acid in order to remove parasitic electrical contacts between laminations. By way of illustration, the present invention not being limited thereto, an example of such a foldable set of interconnected laminates, interconnected via small strips at the edges, is shown in FIG. 4. Although the embodiments of the above aspect have been discussed with reference to a manufacturing method for a stator 110, embodiments of the present aspect also relate to a stator teeth comprising a stacked set of laminates interconnected to each other through a thin strip of material.

Although the embodiments of the above aspect have been discussed with reference to a manufacturing method for a stator 110, embodiments of the present aspect also relate to a stator tooth 114 comprising a stacked set of laminates 302, wherein the laminates 302 were connected to neighbouring laminates 302 through a thin strip of material during assembly, stacked by folding and wherein connections between the laminates 302 were removed after folding.

It is an advantage of embodiments according to the first and second aspect of the present invention, that the production of stator teeth 114, e.g. for an AFPMSM, is made more efficiently. Embodiments of the present invention avoid the need to individually cut and stack many thin laminations with all different shapes. It avoids the need for cutting the different laminations individually and for selecting the right lamination at the right position. It is an advantage of embodiments according to the first or second aspect of the present invention that stator teeth with small tolerances can be made. It is an advantage of embodiments according to the first or second aspect of the present invention that a reduced manufacturing time is obtained for manufacturing stator teeth.

It is an advantage of the first and second aspect of the present invention that the cogging torque is reduced significantly. It is a further advantage of the second aspect of the present invention that by removing the thin strip connection the risk of having circulating currents is reduced.

According to a third aspect, embodiments of the present invention relate to a slotted axial flux machine, e.g. an axial flux permanent magnet machine. The term slotted machine refers to electrical machines whereby the windings of the stator are located between magnetic material. The axial flux machine may have features and advantages according to embodiments as described in or for one or more other aspects, although embodiments of the present invention are not limited thereby. The axial flux machine 100 comprises a non-uniform air gap 602 along the radial direction between the permanent magnet and the stator teeth 114, also referred to as an air gap 602 which length changes along the radial direction or as an air gap changing along the radial direction.

Figure 6:
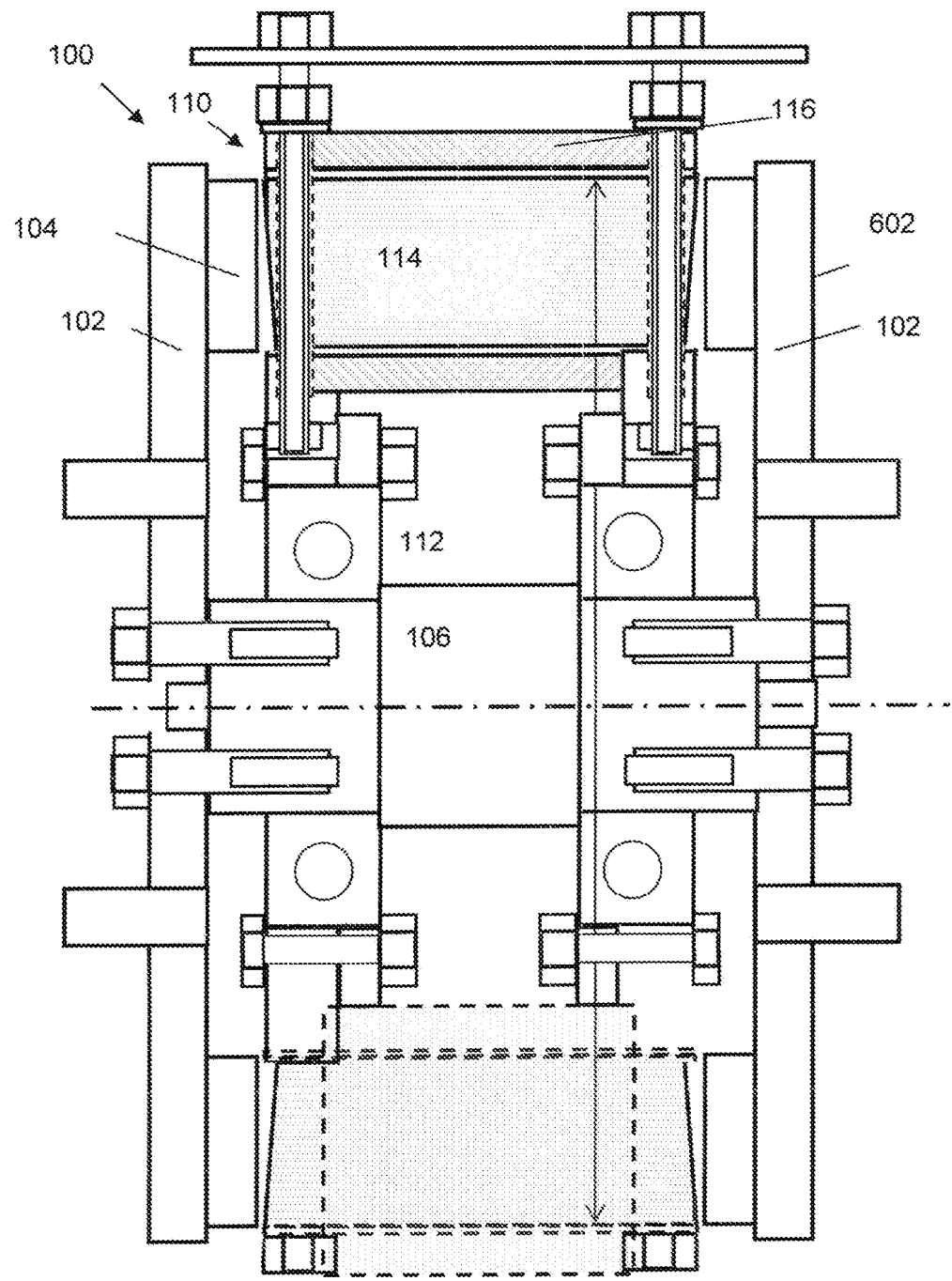
FIG. 6 illustrates an example of an axial flux permanent magnet synchronous motor wherein an inhomogeneous air gap is provided between stator tooth and permanent magnet, according to an embodiment of the present invention.
Figure 7A:
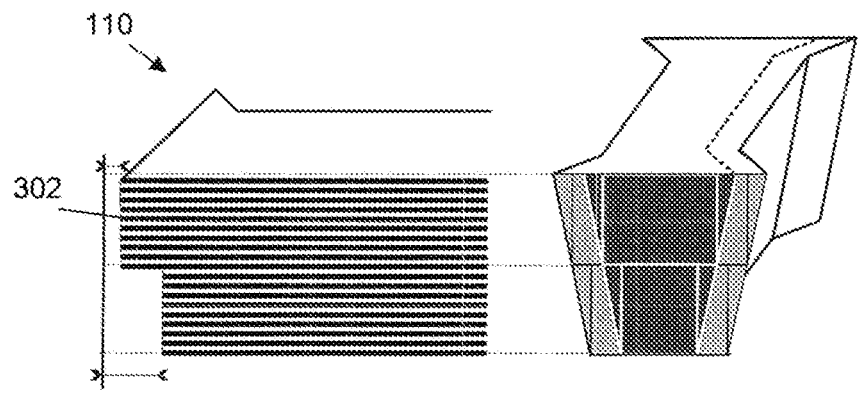
FIG. 7A and FIG. 7B illustrate alternative examples of laminations produced by or lamination made in serpentine shape, as can be used for manufacturing stator teeth, according to embodiments of the present invention.
Figure 7B:
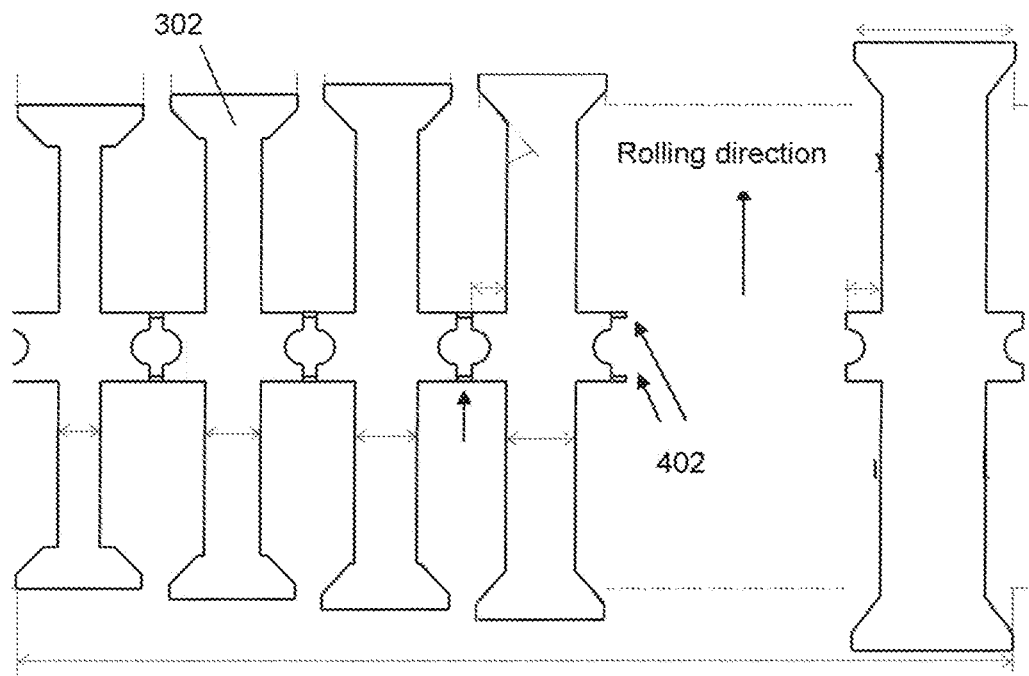

Such an inhomogeneous air gap 602 between the permanent magnet 104 and the stator teeth 114 may correct for unequal magnetization in the stator 110 which occurs when a homogeneous air gap is used as the stator teeth 114 are small at small radius and large at large radius and as a given current in the stator winding thus will cause more saturation of the material at small radius than at high radius. The inhomogeneous air gap 602 may be such that it is smaller at large radius. An example of an inhomogeneous air gap between the tooth 114 and the permanent magnet 104 is illustrated in FIGS. 6, 7A and 7B for an axial flux machine. The air gap 602 as such hence varies with the radius, the air gap 602 being static in time and during operation.

With properly chosen non-uniform air gap 602, the induction level can be almost equal in the whole stator tooth. The air gap 602 may be optimised using a process that mainly includes taking into account the difference in the inner and outer radius differences as to obtain a magnetic reluctance for the flux which is almost identical in each and every section of the stator tooth 114. This optimization process is done for a given stator 110 current which can be e.g. the nominal current of the electrical machine.

As is already mentioned above, embodiments of the present example can be easily combined with embodiments of the first aspect. As the suggested manufacturing technique of the first aspect allows to provide a different geometry for different sets of stacks of laminates 302, thus allowing to make the stator teeth 114 such that an inhomogeneous air gap 602 is induced by the shape of the stator teeth 114, once mounted in the machine. An example of doing so is shown in FIG. 7A, the left portion showing an enlarged portion of the teeth shown in FIG. 7A.

As is already mentioned above, embodiments of the present example can be easily combined with embodiments of the second aspect. As the suggested manufacturing technique of the second aspect allows to provide a different geometry for all laminates 302, thus allowing to make the stator teeth 114 such that an inhomogeneous air gap is induced by the shape of the stator teeth 114, once mounted in the machine. An example of doing so is shown in FIG. 7B.

It is an advantage of embodiments of the present invention that the problem of unequal magnetization is solved in the stator 110, the problem resulting in either a part of the stator 110 being heavily saturated, or a part being used at too low induction. The variation of the thickness of the inhomogeneous air gap 602 to be induced may be in the range 0.2-2 mm, whereby the air gap at small radius may for example be 1.0 mm and the air gap at large radius may for example be 0.5 mm. Optimisation of the values may for example be performed using a geometrical optimization routine, for a given machine. By applying the optimised air gap variation the same electrical machine can have for the same weight but exhibiting a higher torque (as more current can be sent through the windings before the maximum saturation levels are obtained).

The air gap 602 that changes in radial direction cannot only be made by a different geometry of all stator laminations 302, but also—as an alternative—by making a conical rotor.

Whereas the above described aspect of the present invention has been written in relationship to the machine, embodiments according to the present aspect of the present invention also relate to a stator or stator teeth for use in such machine and being adapted for inducing an inhomogeneous air gap when being mounted in the machine.

Although some of the above aspects may result in a slightly more complicated design, e.g. the inhomogeneous air gap, this additional complexity does not overweigh the advantage of an increased efficiency, as e.g. losses of the drive system in electrical vehicles have an important impact on e.g. the total distance range that can be obtained.

Although the above aspects have been written as separate aspects or embodiments, the invention also relates to stator teeth, stators or permanent magnet synchronous machines combining two or more of these aspects. As indicated above for some combinations—the invention not limited thereto—, such combinations may result in still more advantageous embodiments. The present invention therefore encompasses combinations of the different aspects as well as embodiments wherein only a single aspect as set out above is implemented.

It is an advantage of some embodiments according to the present invention that less inductance is present in machines, by applying one or more aspects of the present invention, e.g. by using one or more of using an increased chord factor, choosing a high number of poles made possible due to the low iron losses obtained, by using slightly more slots compared to the number of poles.

It is an advantage of embodiments of the present invention that different aspects of the present invention can be combined so that a good efficiency, torque and power density can be obtained.

By way of illustration, an example of an AFPMSM is described, illustrating some features and advantages of embodiments of the present invention. The exemplary AFPMSM—the invention not being limited thereto—is designed for a speed of 2000 rpm and a power of about 3.6 kW, for use in a combined-heat power application. For a 16 pole machine, the nominal stator frequency is quite high: 267 Hz. At this frequency, it is necessary to choose a stator with sufficiently thin sheets in order to limit the iron losses. The chosen machine configuration was a single stator, dual rotor configuration with concentrated stator coils wound around stator teeth in laminated soft magnetic material.

The machine uses grain-oriented (GO) material instead of NO (non-oriented) material. Amongst others due to the uni-directional magnetic flux in the majority of the stator volume advantages in performances and efficiency of the AFPMSM are obtained by using GO material in stator lamination. The chosen GO material is a relatively good quality material (0.3 mm thickness, 1 W/kg in the rolling direction at 50 Hz and 1.5 T), while the NO material is a rather low quality material (0.5 mm thickness, 7 W/kg at 50 Hz and 1.5 T).

Figure 8A:
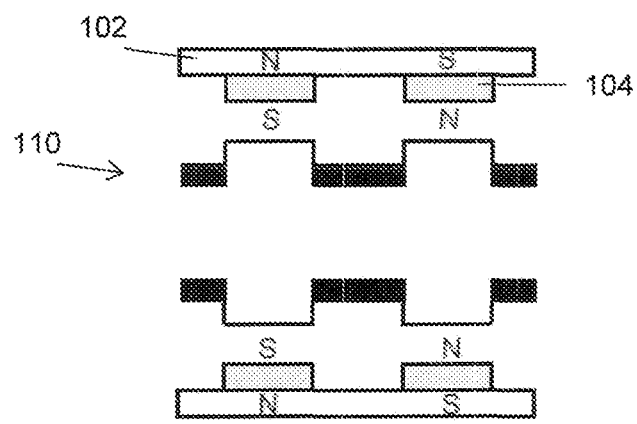
FIG. 8A and FIG. 8B illustrates a single stator dual rotor AFPMSM with axial field in the stator teeth and azimuthal field in the stator yoke (FIG. 8A) and axial field in the stator teeth (FIG. 8B), the latter according to an example of an embodiment of the present invention.
Figure 8B:
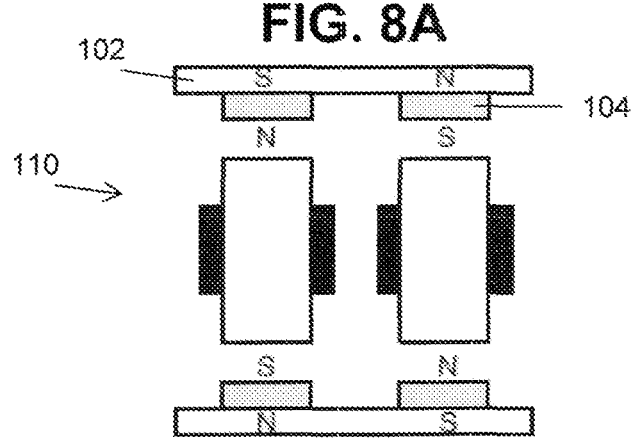

Two possibilities exist for the stator 110 of an AFPMSM with single stator and dual rotor. In the first possibility, the facing magnets 104 on both rotors 102 have equal magnetization orientation, and the stator 110 has both a yoke and teeth (FIG. 8A). The second possibility has facing magnets 104 with opposite magnetization orientation, and a stator 110 that consists of teeth only (FIG. 8B). In the present example, the second type was chosen.

In the present example, a geometry as described in the following was chosen. To the surface of each of the two rotor discs 102, 16 T-shaped, axially-polarised magnets 104 are glued as presented in FIG. 2 and FIG. 9. The T-shape magnets 104 have a remanence of 1.26 T and they consist of small segments in order to reduce eddy current losses. Both rotor yokes were made of solid construction steel of 8 mm thickness. The shaft is made from aluminium. In the stator, the 15 teeth are made of 0.3 mm thick laser-cut GO laminations of 1.0 W/kg losses at 1.5 T and 50 Hz.

The technique of the first aspect of the present invention was used to make the 3D shape for the stator. Two different geometries of I-profiles or laminates 302 were laser-cut (FIG. 10A) and stacked with overlap zone: as depicted on FIG. 10B, the bottom part is made of a narrower lamination profile while the part on the top is wider. This method makes it possible to make a 3D geometry with only two shapes of profiles and a slight reduction of the fill factor: in the (small) overlap zones, the fill factor is only 50%. A concentrated copper winding is put around each stator tooth 114 in two layers with 90 turns in total, resulting in a simple and robust winding.

In order to compare results between different machines, use is made of a numerical finite element model.

Figure 9:
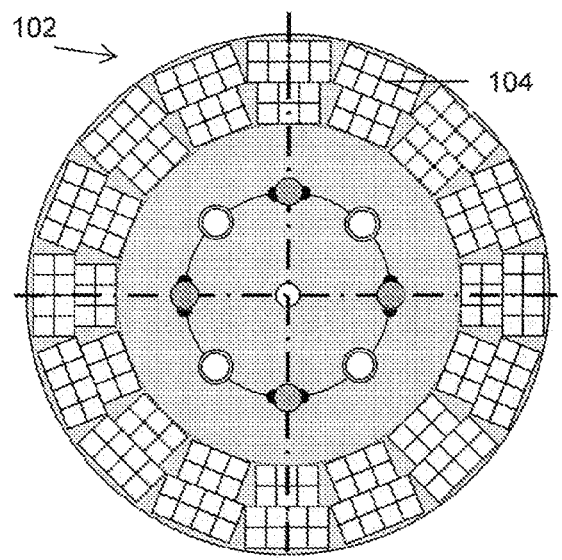
FIG. 9 illustrates a rotor geometry of an AFPMSM, with segmented magnets.
Figure 10A:
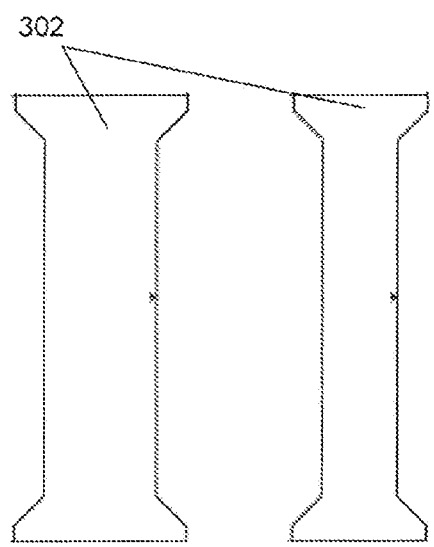
FIG. 10A and FIG. 10B illustrate an example of particular stator laminations (in mm) and a cross-section of a stacked lamination in the stator tooth for an example according to an embodiment of the present invention.
Figure 10B:
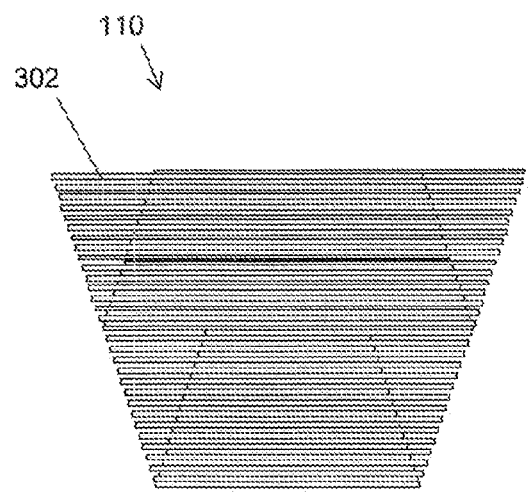
Figure 11:
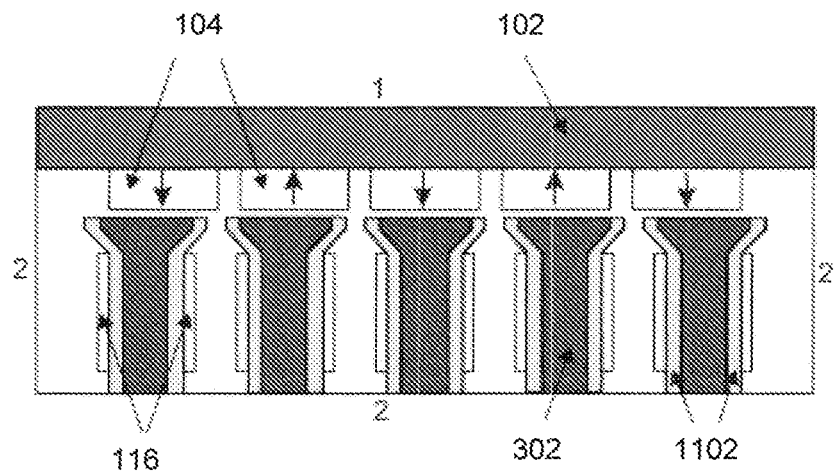
FIG. 11 shows an approximated modeled geometry of an AFPMSM with Dirichlet boundary conditions (1) and Neumann boundary conditions (2), as can be used for deriving the effect of grain oriented material according to an embodiment of the present invention.
Figure 12:
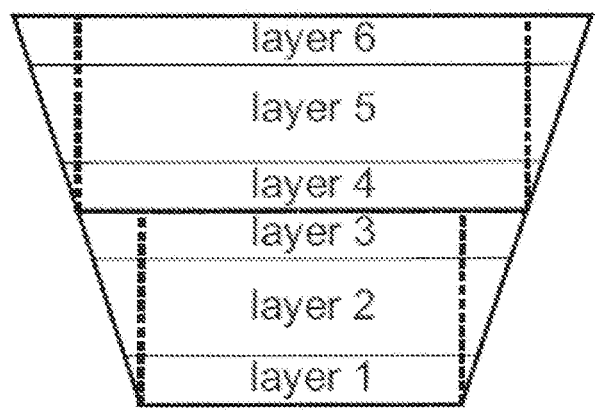
FIG. 12 shows a division of the geometry in layers for a 2D finite element method, illustrated on a stator toot, as can be used for deriving the effect of grain oriented material according to an example of an embodiment of the present invention.

As an axial flux PMSM has intrinsically a 3D geometry, a conventional 2-D FEM to study a machine is not possible for this type of machine. Therefore, the machine is modelled by several layers of 2D models with geometry and boundary conditions in FIG. 11. Only 5 magnets and 5 teeth (⅓) of the machine are modelled. The 2D models are taken in azimuthal direction, along the circumference of the machine. In total, six layers were chosen with unequal thicknesses, as shown in FIG. 12. As shown in the geometry of FIG. 9, the magnets 114 have a T-shape: they are small at small radius (layers 1-3) and wider at large radius (layers 4-6). This corresponds to the stator laminations 302: at layers 1-3, the small I-cores of FIG. 10a are taken, while at layers 4-6, the wide I-cores are modelled. Hence, in each layer, the overlap region 1102 is different.

Concerning the electromagnetic properties, the rotor iron is modelled by a constant permeability of $2000\mu_0$, as the thickness of the rotor iron is sufficient to avoid saturation. The magnets are represented by their recoil line with slope $\mu_0$.

Figure 13:
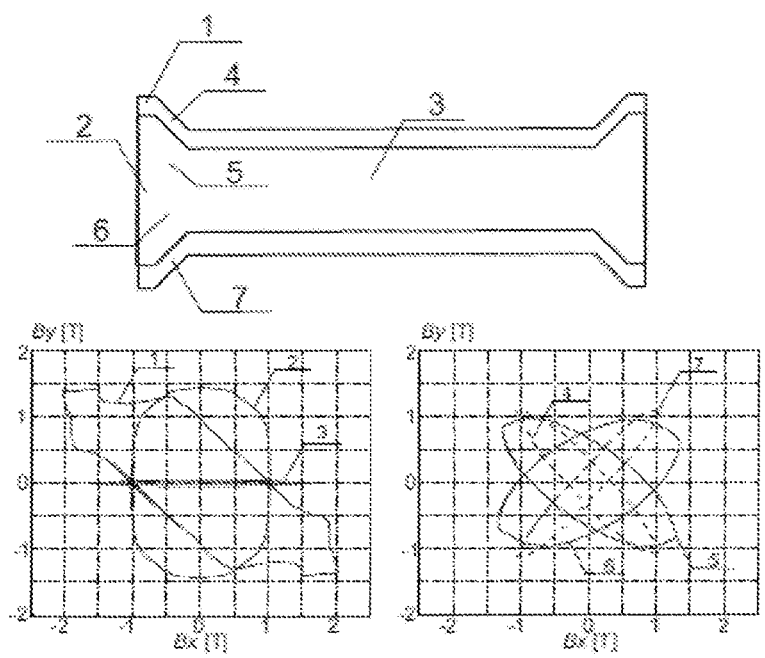
FIG. 13 illustrates the loci at several positions in the stator tooth respectively, as can be used for evaluating the effect of grain oriented material according to an example of an embodiment of the present invention.

FIG. 13 shows the simulated loci of the magnetic induction in several points (7 in total) of the geometry. It is observed that in the tooth tips, the field is rather elliptical than unidirectional, and the dominant field direction differs from the rolling direction. However, in the majority of the tooth volume—almost in the whole lamination except the tips—the field is almost unidirectional and its orientation is close to the rolling direction. Therefore, GO material is an evident choice for this application.

Figure 14:
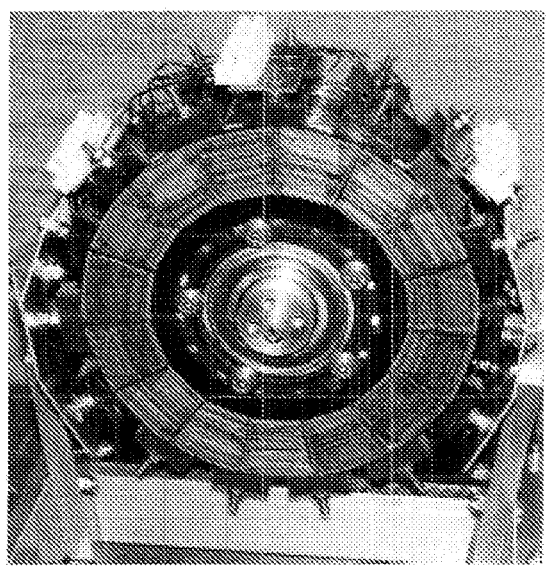
FIG. 14 illustrates a stator with 15 teeth, according to an example of an embodiment of the present invention.

The simulations and experiments were based on a stator 110 of the AFPMSM as can be seen in FIG. 14. It is connected to a 2-pole induction machine of 7.5 kW via a torque sensor. All phase voltages consist of five concentrated windings (five teeth) in series, but the machine was made in such a way that the voltage of each of the 15 windings is accessible separately. The voltage was measured by a National Instruments data-acquisition system with sample speed up to 250 kSamples/second. The speed is obtained from an optical position sensor. The induction machine is supplied by an 11 kW inverter that is controlled by LabVIEW. The setup was constructed to measure the emf and to do the run-out test.

Figure 15:
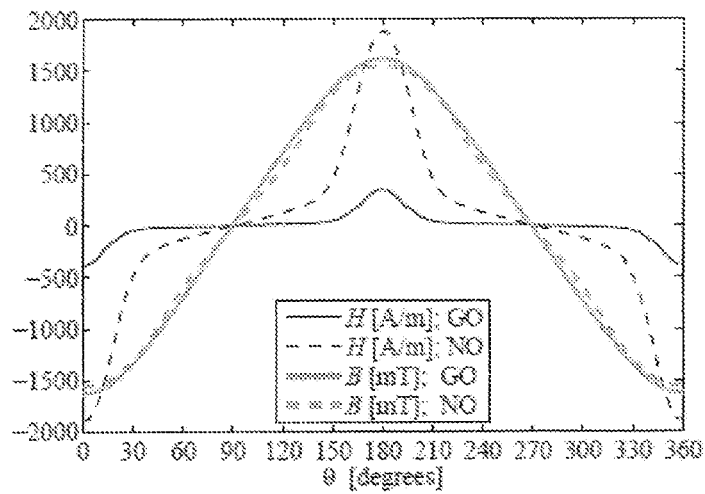
FIGS. 15 and 16 illustrate the waveforms of magnetic field and induction in the center of the stator yoke at no load for NO and GO material, the field pattern in a layer of the stator for GO (a) and NO (b) material and the electromotive force at 1000 rpm in a tooth winding at no load for NO and GO material respectively, as can be used for evaluating the effect of grain oriented material according to an example of an embodiment of the present invention.
Figure 16:
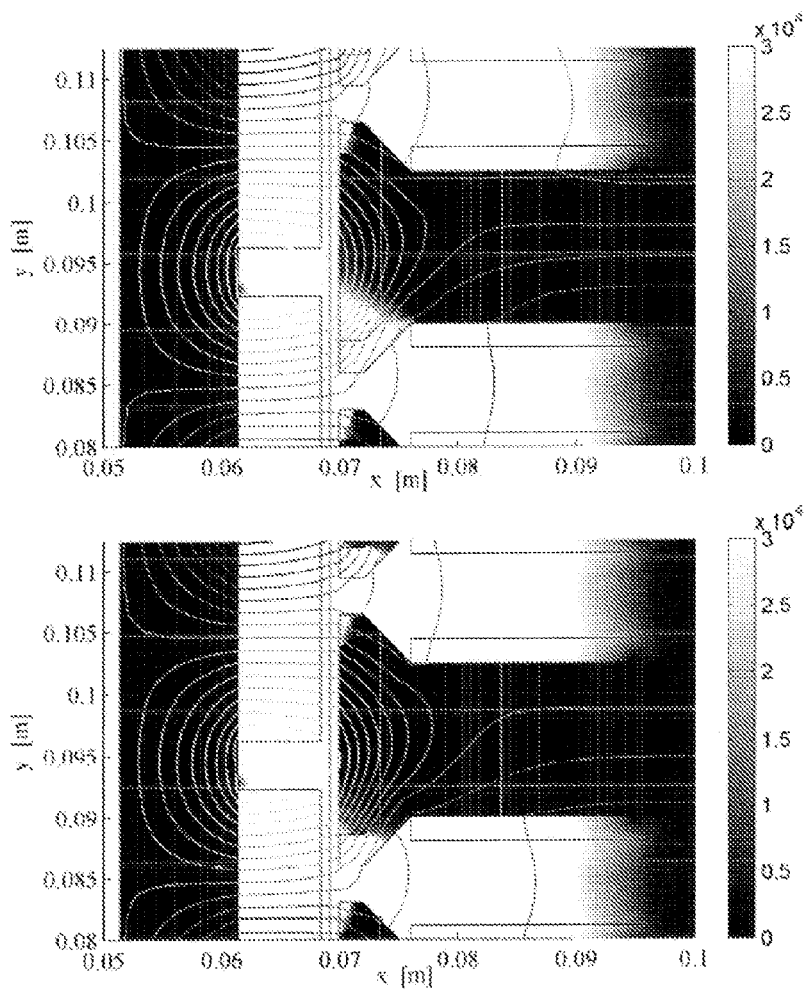

The magnetic field waveforms obtained from 2D FEM during the passing of the magnets is shown in FIG. 15. The difference between GO and NO material depends on the stator current: at no-load, the induction waveform is almost the same for both materials (peak of 1.6 T), but the corresponding field is about 2000 A/m in the NO material, and approximately ten times less in the GO material. When load current is added, the induction of the NO material remains almost the same, because it is saturated; the GO material however reaches a much higher induction, giving rise to higher torque. The difference in field pattern in a NO and a GO stator tooth can be seen in FIG. 16. If the stator contains GO material, the field lines have tendency to align with the rolling direction.

Figure 17:
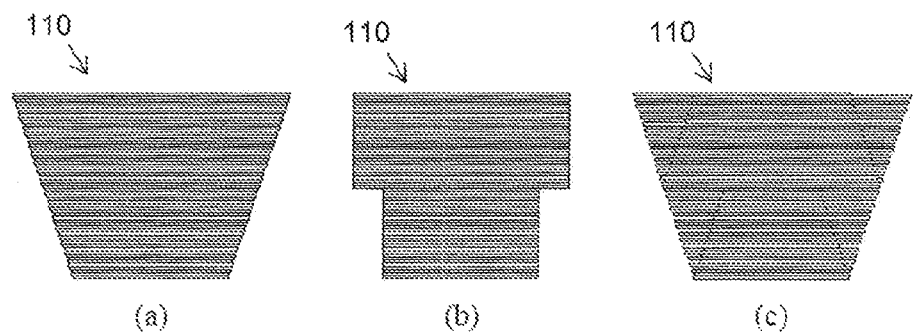
FIG. 17 illustrates the three stator teeth that were used for the stator to simulate the cogging torque.

The above electrical machine was simulated using the above 2D-FEM tools to determine the cogging torque. First a machine with stator teeth manufactured according to the teachings of JP2005-348552 was simulated (FIG. 17 (b)) and the cogging torque was set out as a reference being Tcog.

Next the machine was simulated with stator teeth 110 manufactured according to the first aspect of the present invention and using only two sets of stacked laminates, as described above (FIG. 17 (c)). The simulations showed that the cogging torque was reduced with 12% to 0.88Tcog. Next a simulation was done on a machine with a stator teeth manufactured according to the second aspect of the present invention (FIG. 17 (a)). The resulting cogging torque was further reduced significantly, to 0.58Tcog. This clearly shows the advantages of embodiments of the first and second aspect of the present invention.

The same simulation setup was used to check the influence of a non-uniform air gap. How the air gap should change along the radial direction should be part of a full FEM (Finite Element Model). However, by means of illustration first insights can be obtained using the (simplified) calculation below. First the non-uniform air gap was calculated by way of illustration for the stator teeth according to an embodiment of the second aspect of the present invention and trapezoidal magnets on the rotor. The result of this assumption is that one can assure that the induction level with no load currents is the same all over the stator teeth section and hence also at the inner and outer radial.

Figure 18:
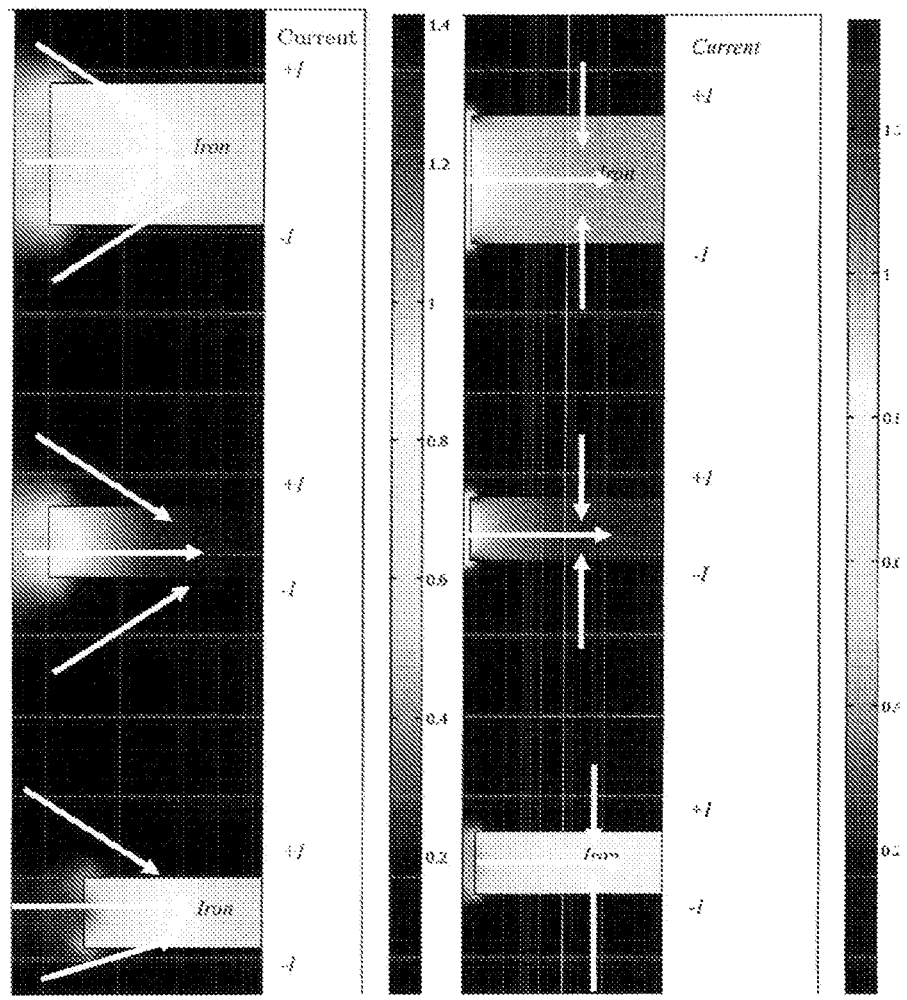
FIG. 18 illustrates the impact of the variable air gap on the magnetic induction levels in the stator teeth at different radii (with laminates having a different width).

FIG. 18 show the magnetic induction in a simplified geometry for a large and a small air gap. The arrows indicate the direction in which the magnetic induction is increasing. The magnet is modelled as air and would be situated on the left of the figures, it is furthermore assumed that the magnets are placed such as to create a uniform magnetic induction inside the stator laminates. Furthermore shown on the top of the figures is a tooth laminate having double the width of the two bottom tooth laminates. This could correspond e.g. with the stator laminate at the outer radius of the electrical machine resp. to the inner radius of the electrical machine. The current in the coils around the three teeth is in each simulation the same and runs around the laminates.

If the air gap is rather large (see FIG. 18 on the left), the figure shows that the induction in a smaller laminate (in the middle of the figure) is much larger than in a large laminate (top of the figure) if the air gap at both laminates is the same. The induction can be made similar by doubling the air gap as shown in the bottom laminate. Hence in this set up the variable air gap is optimized to change linearly and to increase from the value as presented for the upper laminate (most outer laminate) to twice the size for the most inner laminate.

If the air gap is rather small (see FIG. 18 on the right), the induction in the smaller laminate shown in the middle is only slightly larger assuming the same air gap size. Doubling the air gap—which is done for the bottom laminate—results in a lower induction and is overcompensation. Hence in this case the air gap would change linearly from the outer laminate to the inner laminate but the air gap would not double in size.

It is clearly the case that the optimal air gap variation should be a result of numerical optimization taking into account the current level +/−I in FIG. 18, the actual full geometry of the laminates, the magnets, . . . .

The simulation and experimental results based on the models described illustrate advantages of embodiments of the present invention. The above illustration is an example, embodiments of the invention not being limited thereto.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims.

The invention claimed is:

1. A method for fabricating a stator comprising at least one stator tooth for an axial flux machine, the method comprising:
    obtaining a set of substantially identical laminates, and
    stacking the set of substantially identical laminates so that the substantially identical laminates are shifted in such a way that a subsequent laminate has a part overlapping the previous laminate and a part not overlapping the previous laminate, the part overlapping being different in size for at least two positions in the stacked set of substantially identical laminates.

2. A method according to claim 1, wherein stacking the set of substantially identical laminates comprises stacking the laminates such that the part overlapping changes throughout the stacked set of substantially identical laminates.

3. A method according to claim 2, wherein stacking the set of substantially identical laminates comprises stacking the laminates such that the part overlapping increases throughout the stacked set of substantially identical laminates.

4. A method according to claim 1, wherein stacking comprises providing laminates of the set of substantially identical laminates in a holder and positioning the laminates by attracting them to a side of the holder.

5. A method according to claim 1, wherein attracting is performed by providing magnets near the edges positioned in a U-shape, V-shape or cradle shape.

6. A method according to claim 1, wherein manufacturing the at least one stator tooth comprises performing the steps of providing and stacking for two or three different sets of substantially identical laminates.

7. A stator for an electrical machine, the stator comprising:
    at least one stator tooth, the stator tooth comprising a stacked set of substantially identical laminates so that the substantially identical laminates are shifted in such a way that a subsequent laminate has a part overlapping the previous laminate and a part not overlapping the previous laminate, the part overlapping being different in size for at least two positions in the stacked set of substantially identical laminates.

8. A stator according to claim 7, wherein the part overlapping changes throughout the stacked set of substantially identical laminates.

9. A stator according to claim 8, wherein the part overlapping increases throughout the stacked set of substantially identical laminates.

10. An axial flux machine comprising the stator as recited in claim 7.

11. An axial flux machine according to claim 10, the axial flux machine comprising an axial flux permanent magnet synchronous machine.

* * * * *